United States Patent
Baldi et al.

(10) Patent No.: US 10,472,207 B2
(45) Date of Patent: Nov. 12, 2019

(54) PASSENGER-INITIATED DYNAMIC ELEVATOR SERVICE REQUEST

(71) Applicant: Otis Elevator Company, Farmington, CT (US)

(72) Inventors: Emily Baldi, East Hartford, CT (US); Daniel Archibald, Harrison, NY (US); Harrison Daniels, Simsbury, CT (US); James Taylor, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 202 days.

(21) Appl. No.: 15/476,668

(22) Filed: Mar. 31, 2017

(65) Prior Publication Data
US 2018/0282118 A1    Oct. 4, 2018

(51) Int. Cl.
*B66B 5/00* (2006.01)
*H04W 4/02* (2018.01)

(52) U.S. Cl.
CPC .......... *B66B 5/0025* (2013.01); *B66B 5/0087* (2013.01); *H04W 4/02* (2013.01)

(58) Field of Classification Search
CPC .................................................. B66B 5/0025
USPC ......................................................... 187/390
See application file for complete search history.

(56) References Cited

U.S. PATENT DOCUMENTS

| 4,568,909 A * | 2/1986 | Whynacht ............. B66B 5/0006 187/393 |
| 7,610,995 B2 | 11/2009 | Ylinen et al. |
| 8,069,958 B2 | 12/2011 | Lence-Barreiro |
| 8,151,942 B2 | 4/2012 | Rusanen et al. |
| 8,485,317 B2 | 7/2013 | Gerstenkorn et al. |
| 8,682,888 B2 | 3/2014 | Smith |
| 8,893,858 B2 | 11/2014 | Shi et al. |
| 9,300,784 B2 | 3/2016 | Roberts et al. |
| 9,324,120 B2 | 4/2016 | Braun |
| 9,461,761 B1 | 10/2016 | Merithew |
| 9,481,548 B2 | 11/2016 | Siddiqui et al. |
| 9,580,276 B2 | 2/2017 | Toutaoui |
| 9,592,993 B2 | 3/2017 | Joyce et al. |

(Continued)

FOREIGN PATENT DOCUMENTS

| BR | 102013026552 A2 | 8/2015 |
| CN | 201071234 Y | 6/2008 |

(Continued)

OTHER PUBLICATIONS

Apple Inc., "Apple at work", available at: http://www.apple.com/in/business/success-stories/, accessed Mar. 31, 2017, 8 pgs.

(Continued)

*Primary Examiner* — David S Warren

(74) *Attorney, Agent, or Firm* — Cantor Colburn LLP

(57) ABSTRACT

A method of interacting with an elevator system is provided. The method comprising: detecting, using a sensor system, performance data for an elevator system, the elevator system including one or more elevator cars; receiving an issue report from a user mobile device; determining a maintenance issue of the elevator system in response to at least one of the issue report and the performance data; and transmitting the maintenance issue to a maintenance device.

18 Claims, 4 Drawing Sheets

(56) References Cited

U.S. PATENT DOCUMENTS

| | | | |
|---|---|---|---|
| 2006/0144646 A1* | 7/2006 | Engel | B66B 5/0087 187/391 |
| 2011/0067958 A1 | 3/2011 | Schuster et al. | |
| 2015/0038109 A1 | 2/2015 | Salahshour | |
| 2015/0284214 A1 | 10/2015 | Park et al. | |
| 2016/0162980 A1 | 6/2016 | Oldre | |
| 2016/0311650 A1 | 10/2016 | Hautakorpi et al. | |
| 2016/0355375 A1 | 12/2016 | Simcik et al. | |
| 2017/0057781 A1 | 3/2017 | Depaola | |
| 2018/0162688 A1* | 6/2018 | Troesch | B66B 1/468 |
| 2018/0251337 A1* | 9/2018 | Matsueda | B66B 5/00 |
| 2018/0273346 A1* | 9/2018 | Hwang | B66B 5/0012 |
| 2018/0282111 A1* | 10/2018 | Kattainen | H04L 67/125 |
| 2018/0282118 A1* | 10/2018 | Baldi | B66B 5/0087 |
| 2018/0287970 A1* | 10/2018 | Baldi | H04L 51/04 |
| 2018/0297813 A1* | 10/2018 | Essinger | B66B 3/02 |
| 2018/0327219 A1* | 11/2018 | Sudi | B66B 5/0018 |
| 2018/0329848 A1* | 11/2018 | Kattainen | B66B 1/3461 |
| 2018/0332368 A1* | 11/2018 | Copeland | H04L 67/12 |
| 2018/0346283 A1* | 12/2018 | Scoville | B66B 1/3461 |
| 2018/0346286 A1* | 12/2018 | Fauconnet | B66B 5/0025 |
| 2018/0346287 A1* | 12/2018 | Fragner | B66B 1/3415 |

FOREIGN PATENT DOCUMENTS

| | | | |
|---|---|---|---|
| CN | 105293236 A | 2/2016 | |
| WO | 2009150251 A2 | 12/2009 | |
| WO | 2010016827 A1 | 2/2010 | |
| WO | 2014200457 A1 | 12/2014 | |
| WO | 2016207477 A1 | 12/2016 | |
| WO | WO-2017103320 A1 * | 6/2017 | B66B 5/00 |

OTHER PUBLICATIONS

CNIT, "Cloud-App-Terminal Elevator IOT Solutions", China Information Technology, Inc., available at: http://en.chinacnit.com/solution.html, accessed Mar. 31, 2017, 6pgs.

Huawei News Room, "Huawei Launches Elevators Connection Solution", available at: http://support.huawei.com/en/news/global/2016/201609061634, Aug. 31, 2016, 3pgs.

KONE Corporation, "KONE Mobile App", available at: http://www.kone.us/existing-buildings/maintenance/mobile-app/, accessed Mar. 31, 2017, 1pg.

Otis Elevator Co , "Otis eService Mobile App" YouTube video, available at: https://www.youtube.com/watch?v=q4wxioauBaU, accessed Mar. 31, 2017, 2 pgs.

Extended European Search Report for Application No. 18164831.2; Report dated Oct. 10, 2018; 9 pages.

* cited by examiner

PASSENGER-INITIATED DYNAMIC ELEVATOR SERVICE REQUEST

BACKGROUND

The subject matter disclosed herein generally relates to the field of elevator system maintenance, and more particularly to a system that facilitates system maintenance through interaction with a mobile device.

Existing elevator systems require elevator users to call a central service center when entering an elevator service request. Elevator users often do not know who to call, when to call, what to report, and fail to correctly identify the elevator error and time of the error.

BRIEF SUMMARY

According to one embodiment, a method of interacting with an elevator system is provided. The method comprising: detecting, using a sensor system, performance data for an elevator system, the elevator system including one or more elevator cars; receiving an issue report from a user mobile device; determining a maintenance issue of the elevator system in response to at least one of the issue report and the performance data; and transmitting the maintenance issue to a maintenance device.

In addition to one or more of the features described above, or as an alternative, further embodiments of the method may include: receiving maintenance data; determining a maintenance task in response to at least one of the maintenance data and the maintenance issue; and transmitting the maintenance task to a maintenance device.

In addition to one or more of the features described above, or as an alternative, further embodiments of the method may include activating an alarm on the maintenance device when the maintenance issue is received.

In addition to one or more of the features described above, or as an alternative, further embodiments of the method may include determining a time of the issue report in response to at least one of the issue report and the performance data.

In addition to one or more of the features described above, or as an alternative, further embodiments of the method may include determining that maintenance issue is a duplicate maintenance issue; and transmitting an alert to the user mobile device indicating the duplicate maintenance issue.

In addition to one or more of the features described above, or as an alternative, further embodiments of the method may include: determining that maintenance issue is a duplicate maintenance issue; and transmitting an alert to the user mobile device indicating the duplicate maintenance issue.

In addition to one or more of the features described above, or as an alternative, further embodiments of the method may include generating on a user interface a service and maintenance screen on the user mobile device, the service and maintenance screen being configured to allow entry of the issue report.

In addition to one or more of the features described above, or as an alternative, further embodiments of the method may include the issue report may be entered via a verbal input from a user of the user mobile device.

In addition to one or more of the features described above, or as an alternative, further embodiments of the method may include where the issue report may be entered via selection of predefined options on a drop-down menu.

In addition to one or more of the features described above, or as an alternative, further embodiments of the method may include where the predefined options may be selected via a verbal command.

In addition to one or more of the features described above, or as an alternative, further embodiments of the method may include: collecting accelerometer data using an accelerometer located in the user mobile device; and generating an issue report in response to accelerometer data.

In addition to one or more of the features described above, or as an alternative, further embodiments of the method may include: detecting a location of the user mobile device; and determining an elevator car that triggered the issue report in response to at least one of the issue report and the location of the user mobile device.

In addition to one or more of the features described above, or as an alternative, further embodiments of the method may include: detecting a location of the user mobile device; and determining an elevator car that triggered the issue report in response to at least one of the issue report and the location of the user mobile device.

In addition to one or more of the features described above, or as an alternative, further embodiments of the method may include: generating on a user interface a service and maintenance screen on the user mobile device; and displaying at least one maintenance issue on the service and maintenance screen.

In addition to one or more of the features described above, or as an alternative, further embodiments of the method may include: displaying at least one maintenance issue on the service and maintenance screen.

In addition to one or more of the features described above, or as an alternative, further embodiments of the method may include: generating on a user interface a service and maintenance screen on the maintenance device; and displaying at least one maintenance issue on the service and maintenance screen.

In addition to one or more of the features described above, or as an alternative, further embodiments of the method may include: receiving from the maintenance device an indication of completion of a maintenance task; and updating the maintenance database to include completion of the maintenance task.

In addition to one or more of the features described above, or as an alternative, further embodiments of the method may include where the maintenance device is a mobile device.

According to another embodiment, an elevator maintenance management system is provided. The system comprising: a processor; a memory comprising computer-executable instructions that, when executed by the processor, cause the processor to perform operations, the operations comprising: detecting, using a sensor system, performance data for an elevator system, the elevator system including one or more elevator cars; receiving an issue report from a user mobile device; determining a maintenance issue of the elevator system in response to at least one of the issue report and the performance data; and transmitting the maintenance issue to a maintenance device.

According to another embodiment, a computer program product tangibly embodied on a computer readable medium is provided. The computer program product including instructions that, when executed by a processor, cause the processor to perform operations comprising: detecting, using a sensor system, performance data for an elevator system, the elevator system including one or more elevator cars; receiving an issue report from a user mobile device; determining a maintenance issue of the elevator system in response to at least one of the issue report and the performance data; and transmitting the maintenance issue to a maintenance device.

Technical effects of embodiments of the present disclosure include the ability for an elevator user to report an issue with an elevator system via a mobile device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
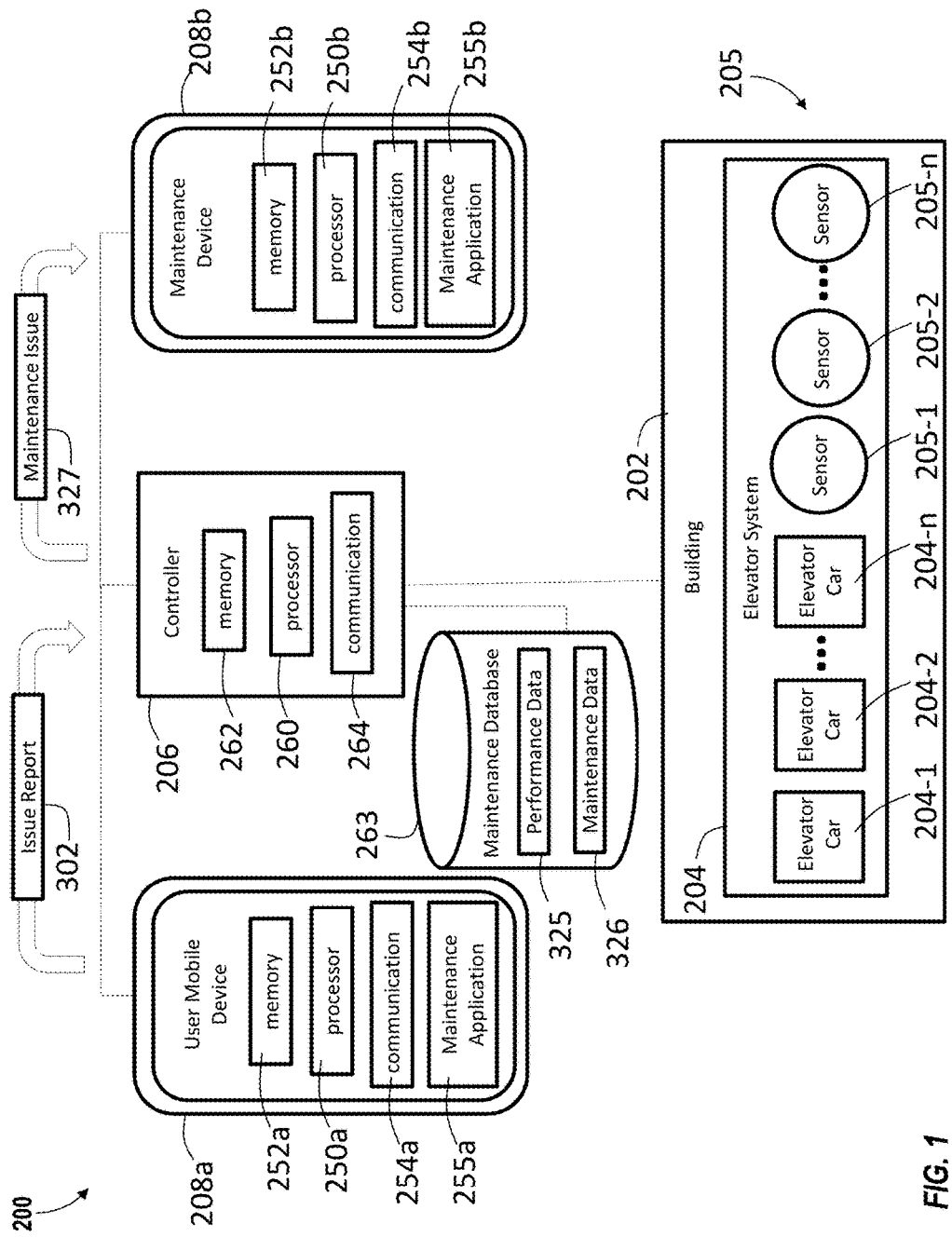
FIG. 1 illustrates a schematic view of a building system, in accordance with an embodiment of the disclosure.

FIG. 1 depicts an elevator maintenance management system 200 in an example embodiment. The elevator maintenance management system 200 includes an elevator system 204 installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator system 204.

The elevator system 204 may be operably connected to one or more computing devices, such as a controller 206. The controller 206 may be configured to control dispatching operations for one or more elevator cars (e.g., elevator cars 204-1, 204-2 . . . 204-n) associated with the elevator system 204. It is understood that the elevator system 204 may utilize more than one controller 206, and that each controller may control a group of elevators cars 204-1 and 204-2. Although two elevator cars 204-1 and 204-2 are shown in FIG. 1, it is understood that any number of elevators cars 204-n may be used in the elevator system 204. The elevator cars 204-1 and 204-2 may be located in the same hoistway or in different hoistways so as to allow coordination amongst elevator cars 204-1 and 204-2 in different elevator banks serving different floors. It is understood that other components of the elevator system 204 (e.g., drive, counterweight, safeties, etc.) are not depicted for ease of illustration.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

The elevator system 204 includes a sensor system 205 having one or more sensors (e.g., 205-1, 205-2, . . . 205-n). Although two sensors 205-1 and 205-2 are shown in FIG. 1, it is understood that any number of sensors 205-n may be used in the sensor system 205. The controller 206 is coupled to the sensor system 205. The sensor system 205 may include one or more sensors (e.g., 205-1, 205-2, . . . 205-n). The sensor system 205 may include a variety of different types of sensors (e.g., 205-1, 205-2, . . . 205-n). The sensor system 205 captures performance and/or other operational data 325 of the elevator system 204. The performance data 325 indicates performance parameters of the elevator system 204, such as for example, location, speed, voltage, vibration, acceleration, noise, jerk, and any other performance parameter of any component of the elevator system 204 known to one of skill in the art.

Other sensors (e.g., 205-1, 205-2, . . . 205-n) in the sensor system may include cameras, people counters, microphones, etc. to capture information relevant to the usage of the elevator system 205. Thus, the type and nature of sensors (e.g., 205-1, 205-2, . . . 205-n) within the sensor system 205 is not limited to the embodiments disclosed herein. The sensor system 205 collects performance data 325 regarding each elevator car (e.g., 204-1, 204-2, . . . 204-n) that may be stored in a maintenance database 263 operatively connected to the controller 206 or stored within the controller 206. In one embodiment, the performance data may be stored on a building computer, remotely in the cloud, or on any other electronic storage medium.

Also shown in FIG. 1 is a user mobile device 208a. The user mobile device 208a may include a device that is typically carried by a person, such as a phone, PDA, smart watch, tablet, laptop, etc. The user mobile device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the user mobile device 208a including executable instructions stored therein, for instance, as firmware. The communication module 254a may implement one or more communication protocols as described in further detail herein. In a non-limiting example, the user mobile device 208a may belong to a resident of the building 202 or an employee who works in the building 202.

Also shown in FIG. 1 is a maintenance device 208b. The maintenance device 208b may be a computing device such as a desktop computer. The maintenance device 208b may also be a mobile computing device that is typically carried by a person, such as, for example a phone, PDA, smart watch, tablet, laptop, etc. The maintenance device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the maintenance device 208b including executable instructions stored therein, for instance, as firmware. The communication module 254b may implement one or more communication protocols as described in further detail herein. The maintenance device 208b may belong to a maintenance worker of the building 202, such as, for example, maintenance personnel, building maintenance manager, and elevator service repair person.

The user mobile device 208a and maintenance device 208b may both be referred to as a device 208 for ease of explanation. The device 208 and the controller 206 communicate with one another. For example, the device 208 and the controller 206 may communicate with one another when proximate to one another (e.g., within a threshold distance). The device 208 and the controller 206 may communicate over a wireless network, such as 802.11x (WiFi), short-range radio (Bluetooth), cellular, satellite, etc. In some embodiments, the controller 206 may include, or be associated with (e.g., communicatively coupled to) a networked element, such as kiosk, beacon, hall call fixture, lantern, bridge, router, network node, door lock, elevator control panel, building intercom system, etc. The networked element may communicate with the device 208 using one or more communication protocols or standards. For example, the networked element may communicate with the device 208 using near field communications (NFC). In other embodiments, the controller 206 may establish communication with a device 208 that is outside of the building 202. This connection may be established with various technologies including GPS, triangulation, or signal strength detection, by way of non-limiting example. In example embodiments, the device 208 communicates with the controller 206 over multiple independent wired and/or wireless networks. Embodiments are intended to cover a wide variety of types of communication between the device 208 and controller 206, and embodiments are not limited to the examples provided in this disclosure. Communication between the device 208 and the controller 206 will allow the controller 206 to determine the location of the device 208 in relation to the elevator system 204 and/or the door system 205. Knowing the relative location of the device 208 will allow the controller 206 to determine what elevator car (e.g., 204-1, 204-2, . . . 204-n) may have caused a user to submit a maintenance request.

Embodiments generate a user interface on the device 208 through a maintenance application 255a, 255b. The maintenance application 255a may be used for user of the elevator system to report maintenance issues regarding the elevator system 204 in an issue report 302. For example, a resident may report that they heard a squeaking in elevator car 204-1.

Figure 2:
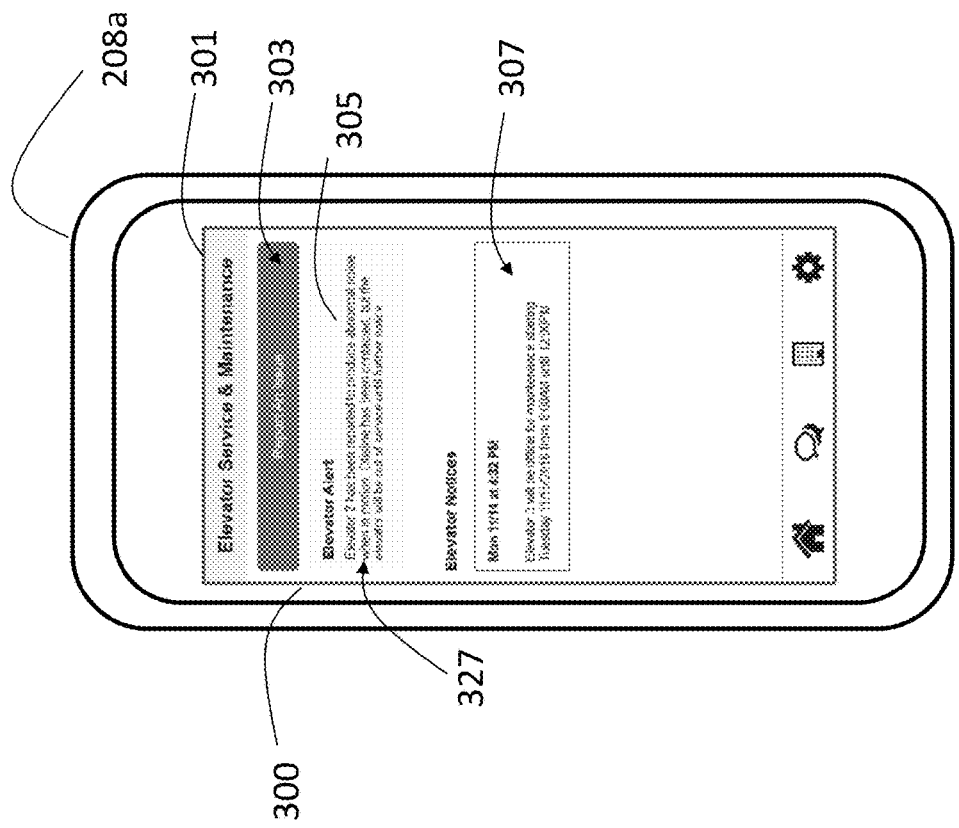
FIG. 2 depicts a user interface on a mobile device, in accordance with an embodiment of the disclosure.
Figure 3:
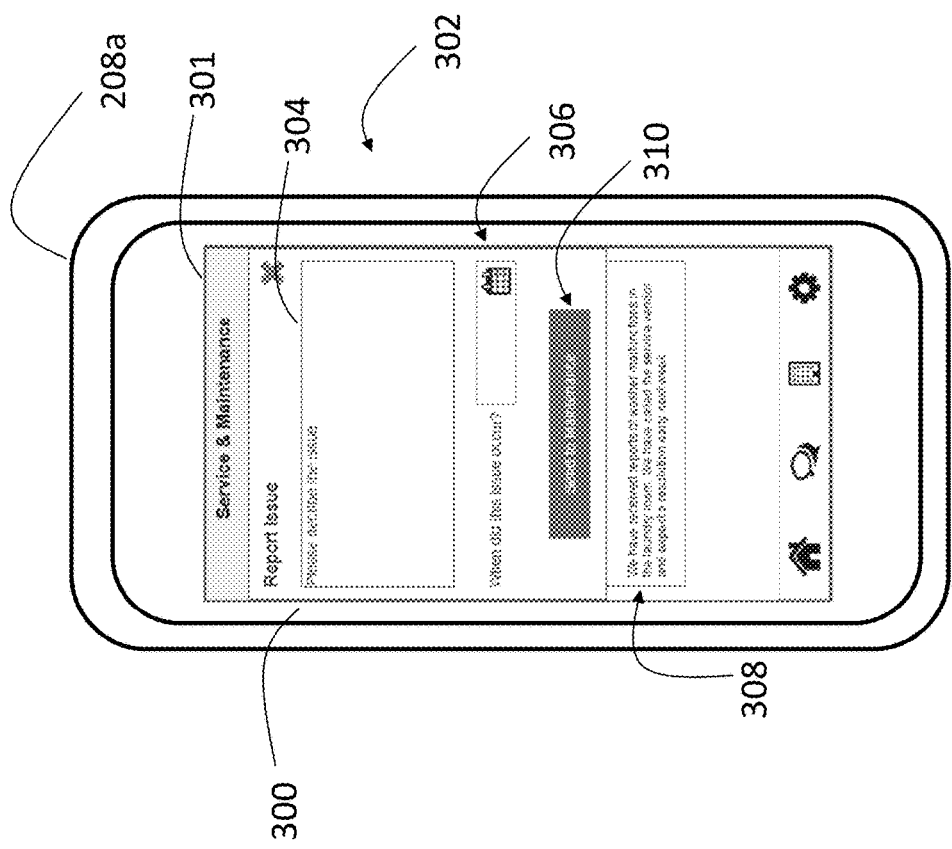
FIG. 3 depicts a user interface on a mobile device, in accordance with an embodiment of the disclosure.

FIGS. 2-3 depict an example user interface 300 on user mobile device 208a. Referring to FIGS. 2-3 with continued reference to FIG. 1, when the user mobile device 208a launches the maintenance application 255a, an elevator service and maintenance screen 301 may be presented as shown in FIG. 2. The maintenance application 255a may display an elevator alert 305 and an elevator notice 307. The elevator alert 305 may indicate maintenance issues 327 that have been reported in the elevator system 204. The elevator notices 307 may indicate scheduled maintenance on the elevator system 204.

In order to report an issue with the elevator system 204, a user can select the "Report an Issue" 303 button, which will prompt the user interface 300 to generate the maintenance screen 301 shown in FIG. 3. As seen in FIG. 3, the service and maintenance screen 301 includes a text input section 304 where an issue with the elevator system 204 may be reported. In an embodiment, the issue report 302 may be manually typed into a text input section 304 by a user of the user mobile device 208a. The text input section 304 is not intended to be limiting as other data input methods may be used, such as, for example drop-down menus or icons to display multiple predefined issue options. The drop-down menus or icons may include issue options for elevator cars and may be categorized with submenu to guide a user in selecting the appropriate issue. The issue options may be a static list of issues and/or dynamic list of issues built using commonly reported issues within the building itself. In an embodiment, the issue report 302 may be entered via selection of predefined issue options on the drop-down menu. In an embodiment, the predefined options may be selected via a verbal command. In another embodiment, the issue report 302 may be entered via a verbal input from a user of the user mobile device 208a. The user mobile device 208a may also contain an accelerometer (not shown) located within the user mobile device 208a and configured to collect accelerometer data. In another embodiment, the issue report 302 is generated in response to the accelerometer data. For example, if the accelerometer detects an unusual jerk of the elevator car (e.g, 204-1, 204-2, . . . 204-n) then an issue report 302 may be automatically generated by the maintenance application 255a detailing the jerk Also, included on the service and maintenance screen 301 is a date entry block 306 where the date that the issue occurred may be entered by the user of the user mobile device 208a. In one embodiment, the date and time of the report may be automatically entered and/or stored by the maintenance application 255a. Additionally, the service and maintenance screen 301 may include a known issues section 308 to display issues with the elevator system 204 that are known and are currently being worked. Advantageously, a known issue section 308 will help avoid duplicity in issue reports 302 that results in wasted time for both the user and the maintenance personnel. Once a user of the user mobile device has completed entry of their issue in the text input section 304, the user may select a "Send to Maintenance" button 310 to transmit the issue report 302 to the controller 206 and eventually maintenance personnel who may view the issue on the maintenance device 208b.

Figure 4:
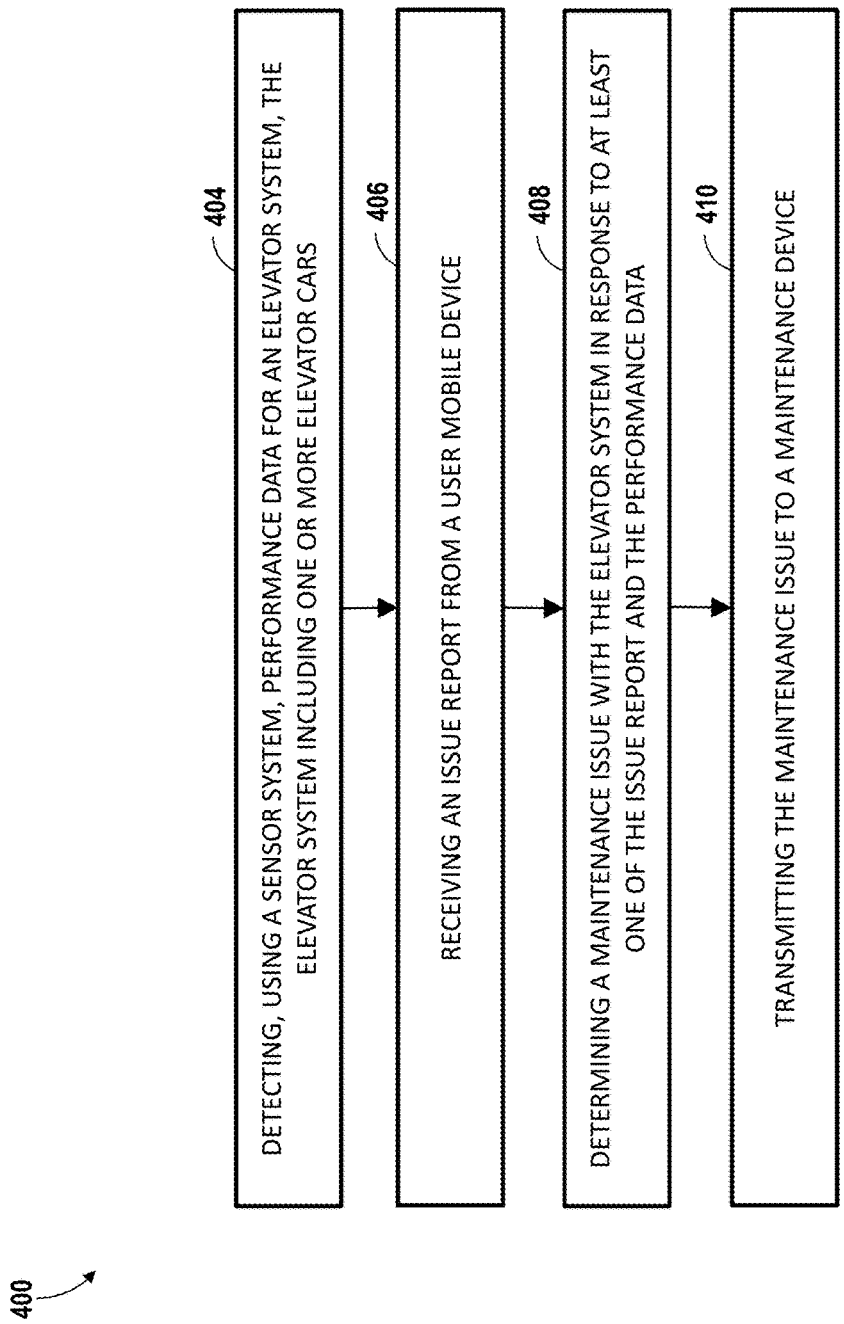
FIG. 4 is a flow diagram illustrating a method of interacting with an elevator system, according to an embodiment of the present disclosure.

Referring now to FIG. 4, while referencing components of FIGS. 1-3. FIG. 4 shows a flow chart of method 400 of interacting with an elevator system, in accordance with an embodiment of the disclosure. At block 404, a sensor system 205 detects performance data 325 for an elevator system 204. The elevator system 204 may include one or more elevator cars (e.g, 204-1, 204-2, . . . 204-n). The sensor system 205 may include one or more sensors (e.g, 205-1, 205-2, . . . 205-n). The performance data 325 indicates performance parameters of the elevator system 204, such as for example, location, speed, voltage, vibration, acceleration, noise, deceleration, jerk, and any other performance parameter of any component of the elevator system 204 known to one of skill in the art. Abnormalities in the performance data 325 may indicate a need for maintenance and issue reports 302 from users of the elevator system 204 may confirm the need for maintenance. In an embodiment, the sensor system 205 collects performance data 325 continuously. In another embodiment, the sensor system 205 collects performance data 325 at predefined intervals and/or when an issue report 302 is received.

At block 406, the controller 206 receives an issue report 302 from a user mobile device 208a. As mentioned above, generated on a user interface 300 is a service and maintenance screen 301 on the user mobile device 208a. The service and maintenance screen 301 is configured to allow entry of the issue report 302. In an embodiment, the issue report 302 may be manually typed into a text input section 304. In another embodiment, the issue report 302 may be entered via a verbal input from a user of the user mobile device 208a. The user mobile device 208a may also contain an accelerometer (not shown) located within the user mobile device 208a and configured to collect accelerometer data. In another embodiment, the issue report 302 is generated in response to the accelerometer data. For example, if the accelerometer detects an unusual jerk of the elevator car (e.g, 204-1, 204-2, . . . 204-n) then an issue report 302 may automatically be generated by the maintenance application 255a detailing the jerk.

At block 408, the controller 206 determines a maintenance issue 327 of the elevator system 204 in response to at least one of the issue report 302 and the performance data 325. For example, the maintenance issue 327 may be that the guide wheel of an elevator car is squeaking. The controller 206 may also determine a maintenance task in response to at least one of the maintenance data 326 and the maintenance issue 327. The maintenance task may be transmitted to a maintenance device 208b. In an example, the maintenance task may be add a lubricant to guide wheels of the elevator car to decrease squeaking. The controller 206 may also receive maintenance data from a maintenance device 208b. For example, after maintenance personnel has performed a maintenance activity on the elevator system 204, the maintenance data 326 may be entered in to the maintenance application 255b on the maintenance device 208b and sent to the controller 206 to be stored in the maintenance database 363.

In an embodiment, the controller 206 may also determine a time of the issue report 302 in response to at least one of the issue report 302 and the performance data 325. In one example, the controller 206 correlates the issue report 302 with performance data 325 in order to determine a time of the issue report 302. In another example, a location of the user mobile device 208a may be tracked in order to determine what elevator car (e.g, 204-1, 204-2, . . . 204-n) the user mobile device 208a has entered and at what time, thus performance data 325 at that same time and elevator car (e.g, 204-1, 204-2, . . . 204-n) may determine the maintenance issue 327. In another embodiment, the controller 206 may also determine that the maintenance issue 327 is a duplicate maintenance issue, meaning that the maintenance issue 327 has already been reported by another issue report 302. If the maintenance issue 327 is a duplicate maintenance issue, then an alert to the user mobile device 208a indicating the duplicate maintenance issue.

At block 410, the controller 206 transmits the maintenance issue 327 to a maintenance device 208b. In an embodiment, an alarm is activated on the maintenance device 208b when the maintenance issue is received. The alarm may also be sent to a central computer/cloud, a maintenance dispatcher and/or the building owner. The alarm may be audible and/or visual. Generated on a user interface 300 is a service and maintenance screen 301 on the maintenance device 208b. The service and maintenance screen 301 being configured to display at least one maintenance issue 327 on the maintenance device 208b. Further, the maintenance issue 327 may also be sent to the user mobile device 208a. Generated on a user interface 300 is a service and maintenance screen 301 on the user mobile device 208a. The service and maintenance screen 301 being configured to display at least one maintenance issue 327 on the maintenance device 208b.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of interacting with an elevator system of a building, the method comprising:
   detecting, using a sensor system, performance data for an elevator system, the elevator system including one or more elevator cars;

generating on a user interface a service and maintenance screen on the user mobile device through a maintenance application, the service and maintenance screen being configured to allow entry of an issue report by a patron of the elevator system, wherein the maintenance report depicts issues regarding the elevator system experienced by the patron of the elevator system;

receiving an issue report from a user mobile device, wherein the issue report is entered via the service and maintenance screen by the patron of the elevator system using the user mobile device;

determining a maintenance issue of the elevator system in response to at least one of the issue report entered via the service and maintenance screen by the patron of the elevator system and the performance data; and transmitting the maintenance issue to a maintenance device belonging to a maintenance worker of the elevator system.

2. The method of claim 1, further comprising:
receiving maintenance data;
determining a maintenance task in response to at least one of the maintenance data and the maintenance issue; and
transmitting the maintenance task to the maintenance device.

3. The method of claim 1, further comprising:
activating an alarm on the maintenance device when the maintenance issue is received.

4. The method of claim 1, further comprising:
determining a time of the issue report in response to at least one of the issue report and the performance data.

5. The method of claim 1, further comprising:
determining that maintenance issue is a duplicate maintenance issue; and
transmitting an alert to the user mobile device indicating the duplicate maintenance issue.

6. The method of claim 4, further comprising:
determining that maintenance issue is a duplicate maintenance issue; and
transmitting an alert to the user mobile device indicating the duplicate maintenance issue.

7. The method of claim 1, wherein:
the issue report may be entered via a verbal input from the patron of the elevator system using the user mobile device.

8. The method of claim 1, wherein:
the issue report may be entered via selection of predefined options on a drop-down menu by the patron of the elevator system using the user mobile device.

9. The method of claim 8, wherein:
the predefined options may be selected via a verbal command.

10. The method of claim 1, further comprising:
detecting a location of the user mobile device; and
determining an elevator car that triggered the issue report in response to at least one of the issue report and the location of the user mobile device.

11. The method of claim 1, further comprising:
generating on a user interface a service and maintenance screen on the user mobile device; and
displaying at least one maintenance issue on the service and maintenance screen.

12. The method of claim 1, further comprising:
displaying at least one maintenance issue on the service and maintenance screen.

13. The method of claim 1, further comprising:
generating on a user interface a service and maintenance screen on the maintenance device; and
displaying at least one maintenance issue on the service and maintenance screen.

14. The method of claim 1, further comprising:
receiving from the maintenance device an indication of completion of a maintenance task; and
updating the maintenance database to include completion of the maintenance task.

15. The method of claim 1, wherein:
the maintenance device is a mobile device.

16. An elevator maintenance management system of a building comprising:
a processor;
a memory comprising computer-executable instructions that, when executed by the processor, cause the processor to perform operations, the operations comprising:
detecting, using a sensor system, performance data for an elevator system, the elevator system including one or more elevator cars;
generating on a user interface a service and maintenance screen on the user mobile device through a maintenance application, the service and maintenance screen being configured to allow entry of an issue report by a patron of the elevator system, wherein the maintenance report depicts issues regarding the elevator system experienced by the patron of the elevator system;
receiving an issue report from a user mobile device, wherein the issue report is entered via the service and maintenance screen by the patron of the elevator system using the user mobile device;
determining a maintenance issue of the elevator system in response to at least one of the issue report entered via the service and maintenance screen by the patron of the elevator system and the performance data; and
transmitting the maintenance issue to a maintenance device belonging to a maintenance worker of the elevator system.

17. A method of interacting with an elevator system, the method comprising:
detecting, using a sensor system, performance data for an elevator system, the elevator system including one or more elevator cars;
collecting accelerometer data using an accelerometer located in the user mobile device;
generating an issue report in response to accelerometer data;
receiving an issue report from a user mobile device, wherein the issue report is generated using the user mobile device;
determining a maintenance issue of the elevator system in response to at least one of the issue report and the performance data; and
transmitting the maintenance issue to a maintenance device.

18. The method of claim 17, further comprising:
detecting a location of the user mobile device; and
determining an elevator car that triggered the issue report in response to at least one of the issue report and the location of the user mobile device.

* * * * *